United States Patent
Kolodziejska et al.

(10) Patent No.: US 10,189,226 B1
(45) Date of Patent: Jan. 29, 2019

(54) THREE-DIMENSIONAL MICRO-TRUSS STRUCTURE

(71) Applicant: HRL LABORATORIES, LLC, Malibu, CA (US)

(72) Inventors: Joanna A. Kolodziejska, Pasadena, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 771 days.

(21) Appl. No.: 14/156,299

(22) Filed: Jan. 15, 2014

Related U.S. Application Data

(62) Division of application No. 13/437,853, filed on Apr. 2, 2012, now Pat. No. 8,663,539.

(51) Int. Cl.
| | | |
|---|---|---|
| *B32B 3/12* | (2006.01) | |
| *B81B 7/04* | (2006.01) | |
| *G02B 6/138* | (2006.01) | |

(52) U.S. Cl.
CPC ........................ *B32B 3/12* (2013.01)

(58) Field of Classification Search
CPC ... Y10T 428/24149; G02B 6/138; B32B 3/12; B81B 1/006; B81B 7/04; B81B 2203/0369; B81B 2203/0384; B81B 2203/0392; B81B 2207/056
USPC ........................ 428/116, 137, 315.5
See application file for complete search history.

(56) References Cited

U.S. PATENT DOCUMENTS

| | | | |
|---|---|---|---|
| 4,752,498 A | | 6/1988 | Fudim |
| 5,217,653 A | | 6/1993 | Mashinsky et al. |
| 5,431,821 A | * | 7/1995 | Olesik .................... B01D 15/08 |
| | | | 210/198.2 |
| 5,578,901 A | * | 11/1996 | Blanchet-Fincher ... H01J 1/304 |
| | | | 313/309 |
| 7,382,959 B1 | | 6/2008 | Jacobsen |
| 7,653,279 B1 | * | 1/2010 | Jacobsen ................ B82Y 20/00 |
| | | | 385/129 |
| 2003/0003127 A1 | | 1/2003 | Brown et al. |
| 2005/0154567 A1 | * | 7/2005 | Jackman ................ B81B 1/006 |
| | | | 703/2 |
| 2005/0202206 A1 | | 9/2005 | Wadley et al. |

(Continued)

OTHER PUBLICATIONS

Jacobsen, et al. "Compression behavior of micro-scale truss structures formed from self-propagating polymer waveguides," Science Direct, vol. 55, pp. 6724-6733 (2007).

(Continued)

*Primary Examiner* — Joanna Pleszczynska
(74) *Attorney, Agent, or Firm* — Lewis Roca Rothgerber Christie, LLP

(57) ABSTRACT

A three-dimensional micro-truss structure includes: a plurality of first struts extending along a first direction; a plurality of second struts extending along a second direction; a plurality of third struts extending along a third direction; and a plurality of fourth struts extending along a fourth direction, wherein the first, second, third, and fourth struts interpenetrate one another at a plurality of nodes and wherein at least one of the first, second, and third directions extends at a non-perpendicular angle with respect to a plane, the plane being substantially perpendicular to the fourth direction.

20 Claims, 9 Drawing Sheets
(7 of 9 Drawing Sheet(s) Filed in Color)

(56) References Cited

U.S. PATENT DOCUMENTS

2005/0255289 A1 11/2005 Wadley
2010/0172623 A1* 7/2010 Park .................... C07C 43/225
385/143

OTHER PUBLICATIONS

Jacobsen, et al. "Micro-scale Truss Structures formed from Self-Propagating Photopolymer Waveguides," Advanced Materials, vol. 19, pp. 3892-3896 (2007).

Jacobsen, et al. "Micro-scale Truss Structures with Three-Fold and Six-Fold Symmetry Formed From Self-Propagating Polymer Waveguides," ScienceDirect, vol. 56, pp. 2540-2548 (2008).

Jacobsen, et al. "Shear behavior of polymer micro-scale truss structures formed from self-propagating polymer waveguides," Science Direct, vol. 56, pp. 1209-1218 (2008).

Queheillalt, et al. "Cellular metal lattices with hollow trussses," Science Direct, vol. 53, pp. 303-313 (2005).

Wadley, et al. "Fabrication and structural performance of periodic cellular metal sandwich structures," Science Direct, vol. 63, pp. 2331-2343 (2003).

* cited by examiner

THREE-DIMENSIONAL MICRO-TRUSS STRUCTURE

CROSS-REFERENCE TO RELATED APPLICATION

This application is a divisional of U.S. patent application Ser. No. 13/437,853, filed Apr. 2, 2012, and entitled "PROCESS OF MAKING A THREE-DIMENSIONAL MICRO-TRUSS STRUCTURE," the entire contents of which are incorporated herein by reference.

BACKGROUND

An ordered three-dimensional (3D) microstructure is an ordered 3D structure at the micrometer scale. Currently, polymer cellular materials that are mass produced are created through various foaming processes, which yield random (not ordered) 3D microstructures. Techniques do exist to create polymer materials with ordered 3D microstructures, such as stereolithography techniques; however, these techniques rely on a bottom-up, layer-by-layer approach which prohibits scalability.

A stereolithography technique is a technique that builds a 3D structure in a layer-by-layer process. This process usually involves a platform (substrate) that is lowered into a photo-monomer (photopolymer) bath in discrete steps. At each step, a laser is scanned over the area of the photo-monomer that is to be cured (polymerized) for that particular layer. Once the layer is cured, the platform is lowered a specific amount (determined by the processing parameters and desired feature/surface resolution) and the process is repeated until the full 3D structure is created. One example of such a stereolithography technique is disclosed in Hull et al., "Apparatus For Production Of Three-Dimensional Objects By Stereolithography," U.S. Pat. No. 4,575,330, filed Aug. 9, 1994, issued Mar. 11, 1986, which is incorporated by reference herein in its entirety.

Modifications to the above described stereolithography technique have been developed to improve the resolution with laser optics and special resin formulations, as well as modifications to decrease the fabrication time of the 3D structure by using a dynamic pattern generator to cure an entire layer at once. One example of such a modification is disclosed in Bertsch et al., "Microstereolithography: A Review," Materials Research Society Symposium Proceedings, Vol. 758, 2003, which is incorporated by reference herein in its entirety. A fairly recent advancement to the standard stereolithography technique includes a two-photon polymerization process as disclosed in Sun et al., "Two-Photon Polymerization And 3D Lithographic Microfabrication," APS, Vol. 170, 2004, which is incorporated by reference herein in its entirety. However, this advanced process still relies on a complicated and time consuming layer-by-layer approach.

Previous work has also been done on creating polymer optical waveguides. A polymer optical waveguide can be formed in certain photopolymers that undergo a refractive index change during the polymerization process. If a monomer that is photo-sensitive is exposed to light (typically UV) under the right conditions, the initial area of polymerization, such as a small circular area, will "trap" the light and guide it to the tip of the polymerized region due to this index of refraction change, further advancing that polymerized region. This process will continue, leading to the formation of a waveguide structure with substantially the same cross-sectional dimensions along its entire length. The existing techniques to create polymer optical waveguides have allowed only one or a few waveguides to be formed and these techniques have not been used to create a self-supporting three-dimensional structure by patterning polymer optical waveguides.

Three-dimensional ordered polymer cellular structures have also been created using optical interference pattern techniques, also called holographic lithography; however, structures made using these techniques have an ordered structure at the nanometer scale and the structures are limited to the possible interference patterns, as described in Campbell et al., "Fabrication Of Photonic Crystals For The Visible Spectrum By Holographic Lithography," NATURE, Vol. 404, Mar. 2, 2000, which is incorporated by reference herein in its entirety.

U.S. Pat. No. 6,698,331 ("Use of metal foams in armor systems") and U.S. Pat. No. 7,128,963 ("Ceramic composite body, method for fabricating ceramic composite bodies, and armor using ceramic composite bodies"), which are incorporated by reference herein in their entirety, propose blast protection material systems that incorporate random cellular ceramic or metallic foam as an energy absorbing layer. However, these patent disclosures do not provide an ordered micro-truss structure. The use of lattice (truss) materials for energy absorbing application is discussed in U.S. Pat. No. 7,382,959 ("Optically oriented three-dimensional polymer microstructures"); U.S. Pat. No. 8,197,930 ("Three-Dimensional Ordered Open-Cellular Structures") application Ser. No. 11/801,908 filed on May 10, 2007; U.S. Pat. No. 8,320,727 ("Composite Structures with Ordered Three-Dimensional (3D) Continuous Interpenetrating Phases") application Ser. No. 12/008,479 filed on Jan. 11, 2008; U.S. Pat. No. 7,687,132 ("Ceramic Microtruss"), application Ser. No. 12/074,727, filed on Mar. 5, 2008); U.S. Pat. No. 7,653,276 ("Composite Structures for Storing Thermal Energy") application Ser. No. 12/075,033 filed on Mar. 6, 2008; Application Ser. No. 12/455,449 ("Micro-truss based energy absorption apparatus") filed on Jun. 1, 2009; and U.S. Pat. No. 8,353,240 ("Compressible Fluid Filled Micro-truss for Energy Absorption") application Ser. No. 12/928,947 filed on Dec. 22, 2010 which are incorporated by reference herein in their entirety. Various micro-truss structures and methods of manufacturing micro-truss structures are described, for example, in U.S. patent application Ser. No. 12/455,449 ("Micro-truss based energy absorption apparatus"), which discloses a method of fabricating micro-truss structures having a fixed area; U.S. Pat. No. 8,367,306 ("Method of Continuous or Batch Fabrication of Large Area Polymer Micro-Truss Structured Materials") U.S. patent application Ser. No. 12/835,276, which discloses a method of continuously fabricating micro-truss structures according to a continuous process (e.g., a strip of arbitrary length); and U.S. Pat. No. 8,353,240 ("Compressible Fluid Filled Micro-truss for Energy Absorption") U.S. patent application Ser. No. 12/928,947, which discloses a compressible fluid filled micro-truss for energy absorption, each of which is incorporated by reference herein in its entirety.

In designing these structures, a design tradeoff is often made between providing resistance against shear and compression forces.

Therefore, there is still a demand for lightweight materials that are capable of resisting both shear and compression forces and a material in which its resistance to shear forces and compression forces can be independently controlled during the design process.

The above information disclosed in this Background section is only for enhancement of understanding of the background of the invention and therefore it may contain information that does not form the prior art that is already known in this country to a person skilled in the art.

SUMMARY

Aspects of embodiments of the present invention are directed toward patterning one or more polymer waveguides to form an ordered three-dimensional (3D) microstructure (or "microtruss") composed of one or more struts and/or a system and method to fabricate the one or more polymer waveguides to form the three-dimensional microstructure composed of one or more struts which has a structure in which the characteristics of the structure in resisting shear and compression forces can be independently controlled during the design process.

According to one embodiment of the present invention, a three-dimensional micro-truss structure includes: a plurality of first polymer waveguide struts extending along a first direction; a plurality of second polymer waveguide struts extending along a second direction; a plurality of third polymer waveguide struts extending along a third direction; and a plurality of fourth polymer waveguide struts extending along a fourth direction, wherein the first, second, third, and fourth struts interpenetrate one another at a plurality of nodes and wherein at least one of the first, second, and third directions extends at a non-perpendicular angle with respect to a plane, the plane being substantially perpendicular to the fourth direction.

Each of the first, second, and third polymer waveguide struts may have substantially the same cross sectional area.

Each of the plurality of fourth polymer waveguide struts may have a cross sectional area substantially the same as the cross sectional area of the first, second, and third polymer waveguide struts.

Each of the fourth polymer waveguide struts may have a cross sectional area that is independent of the cross sectional area of the first, second, and third polymer waveguide struts.

Each of the plurality of fourth polymer waveguide struts may intersect a corresponding node of the plurality of nodes.

The non-perpendicular angle may be at 45°.

At least one of the plurality of fourth polymer waveguide struts may have a circular cross sectional shape.

At least one of the plurality of fourth polymer waveguide struts may have an n-petal cross sectional shape.

n may be four and the at least one of the plurality of fourth polymer waveguide struts may have a plus shaped cross section.

n may be three.

n may be five.

The plurality of first polymer waveguide struts, the plurality of second polymer waveguide struts, the plurality of third polymer waveguide struts, and the plurality of fourth polymer waveguide struts may be coated with metal.

The polymer waveguides may be converted into vitreous carbon.

The vitreous carbon may be coated with silicon carbide, niobium, diamond, vitreous carbon, aramid fibers, polycarbonate, polystyrene, nylon, ultra-high molecular weight polyethylene, or ceramic.

According to one embodiment of the present invention, a method of manufacturing a three-dimensional micro-truss structure includes: exposing a volume of photo-monomer to collimated light through a mask, the collimated light passing through a plurality of first apertures of the mask at a non-perpendicular angle with respect to the mask; forming a plurality of angled polymer waveguides into the photo-monomer at the non-perpendicular angle to form the three-dimensional micro-truss structure; exposing the volume of photo-monomer to collimated light through the mask, the collimated light passing through a plurality of second apertures of the mask in a direction perpendicular to the mask; and forming a plurality of vertical polymer waveguides into the photo-monomer in the direction perpendicular to the mask to further form the three-dimensional micro-truss structure.

The forming of the plurality of vertical polymer waveguides may occur concurrently with the forming of the plurality of angled polymer waveguides.

The forming of the plurality of vertical polymer waveguides may occur after the forming of the plurality of angled polymer waveguides.

The forming of the plurality of vertical polymer waveguides may occur before the forming of the plurality of angled polymer waveguides.

The size and shape of each of the first apertures may be the same as the size and shape of each of the second apertures.

The size and shape of each of the first apertures may be different from and independent of the size and shape of each of the second apertures.

The second apertures may be significantly larger than the first apertures.

According to another embodiment of the present invention, a three-dimensional micro-truss structure includes: a plurality of first struts defined by a plurality of first self-propagating polymer waveguides and extending along a first direction; a plurality of second struts defined by a plurality of second self-propagating polymer waveguides and extending along a second direction; a plurality of third struts defined by a plurality of third self-propagating polymer waveguides and extending along a third direction; and a plurality of fourth struts defined by a plurality of fourth self-propagating waveguides extending along a fourth direction, wherein the first, second, third, and fourth struts interpenetrate one another at a plurality of nodes, and where it at least one of the first, second, and third directions extends at a non-perpendicular angle with respect to a plane, the plane being substantially perpendicular to the fourth direction.

The plurality of first struts, the plurality of second struts, the plurality of third struts, and the plurality of fourth struts may include metal, silicon carbide, niobium, diamond, vitreous carbon, aramid fibers, polycarbonate, polystyrene, nylon, or ultra-high molecular weight polyethylene.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
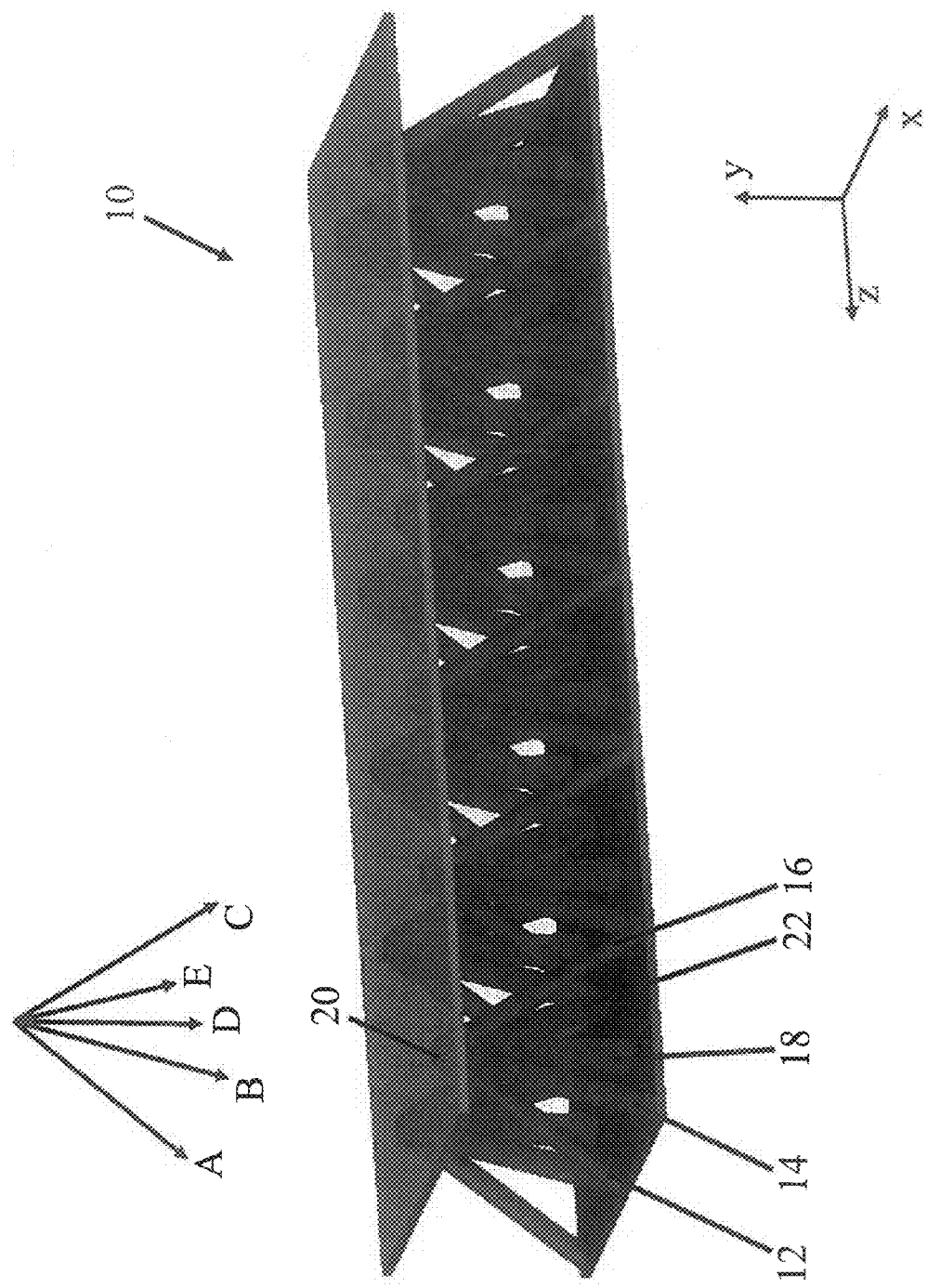
FIG. 1 is a perspective view of a micro-truss structure according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Referring to FIGS. 1, 2a, 2b, and 2c, a three-dimensional ordered open-cellular microstructure 10 according to an embodiment of the present invention is a self-supporting structure. In one embodiment of the present invention, this three-dimensional ordered open-cellular micro-truss 10 can be utilized or modified for use in a fluidic micro-truss based blast protection apparatus and/or to manufacture the fluidic micro-truss based blast protection apparatus. The micro-truss 10 includes a plurality of angled struts (or angled "trusses," "truss elements," "truss members," or "polymer waveguides") including first angled struts 12, second angled struts 14, and third angled struts 16, which extend along a first direction A, a second direction B, and a third direction C, respectively. The micro-truss 10 also includes vertical struts 18 which extend along a vertical direction D. With reference to FIGS. 1 and 2, the first, second, and third angled struts 12, 14, 16 and the vertical struts 18 interpenetrate each other at nodes 20 to form a continuous material with a three-dimensional microstructure order having a tetrahedral form (e.g., with 3-fold symmetry). In some embodiments, the micro-truss further includes fourth angled struts 22 which extend along a fourth direction E and which also interpenetrate with the first, second, and third angled struts 12, 14, and 16 and the vertical struts 18 at nodes 20 to an octahedral structure (e.g., with 4-fold symmetry). Still other embodiments may include six angled struts to form structures having hexagonal structures (e.g., with 6-fold symmetry).

The micro-truss elements (or struts) 12, 14, 16, and 18 may include a photo-polymer material. The micro-truss elements 12, 14, 16, and 18 may be polymer optical waveguide micro-truss elements.

The continuous material may be continuously formed such that it lacks any interior boundaries, e.g., boundaries within the interpenetrating portions of micro-truss elements 12, 14, 16, and 18. Each node 20 of the micro-truss structure 10 may be formed of the continuous material.

According to one embodiment of the present invention, the micro-truss 10 is formed by using a fixed light input (collimated UV light) to cure (polymerize) a fluid, photosensitive monomer into polymer optical waveguides (or "polymer waveguides" or "polymer waveguide struts"), which can self-propagate in a 3D pattern. As such, the propagated polymer optical waveguides form the polymer waveguide struts of the micro-truss 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with substantially the same cross-sectional dimensions along its entire length.

According to one embodiment of the present invention, a mask with a two-dimensional pattern of apertures 340 (see FIGS. 4a and 4b) is used with a light source and photomonomer to create an ordered 3D polymer micro-truss structure (or an open-cell polymer micro-truss structure).

Figure 3A:
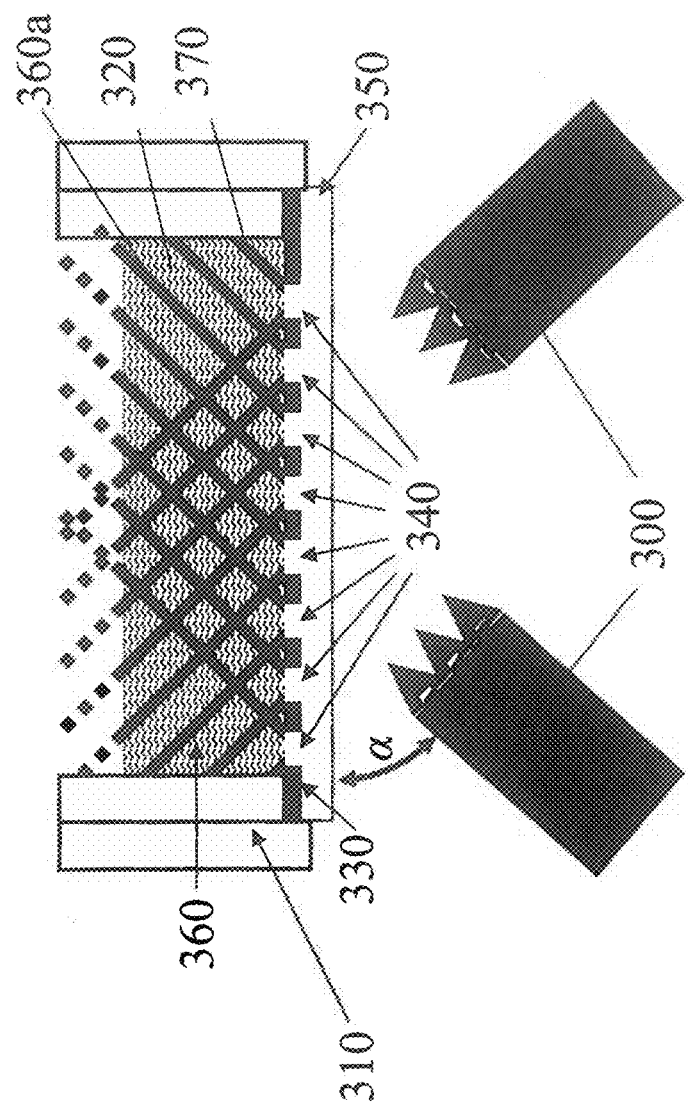
FIGS. 3a an 3b are schematic cross-sectional diagrams of a system for forming a structure from multiple waveguides created using a single collimated beam or multiple collimated beams passing through multiple apertures located at the bottom of the channel in both angled and vertical directions according to one embodiment of the present invention.

FIG. 3a is a schematic cross-sectional diagram of a system for forming a structure from multiple waveguides (or struts) created using a single collimated beam or multiple collimated beams passing through multiple apertures located at the bottom of the channel. With reference to FIG. 3a, a system for forming an ordered 3D polymer micro-truss structure according to an embodiment of the present invention includes one or more collimated light sources 300, a channel/mold 310 having (or containing) photo-monomer 320 that will polymerize at a wavelength of collimated light beams provided by the light sources 300, and a patterning apparatus, such as a mask 330 with one or more apertures (open areas) 340. Each of the apertures 340 has a given shape and dimension substantially matching a cross-sectional geometry of a waveguide (e.g. waveguide 360a).

Continuing with FIG. 3a, the mask 330 rests on the transparent substrate (or transparent plate) 350 that includes the bottom of the channel/mold 310. In one embodiment, the mask 330 is made of a lightweight, flexible, and opaque material such as polyethylene terephthalate (PET) film. The transparent substrate 350 may be made of a material (such as quartz) that is transparent to the light emitted from the collimated light sources, such that the collimated light shines into an exposure area 410 of the channel. In other embodiments, the transparent substrate 350 acts as the mask 330 (e.g., portions of the transparent substrate 350 are opaque while other portions are transparent). The photo-monomer 320 fills the channel 310 above the mask 330. In one embodiment, different thicknesses of micro-truss structures can be achieved by filling the channel (or mold) 310 with photo-monomer 320 to the desired height. Once the collimated light source is applied, the intersecting polymer waveguides 360a (previously also referred to as first, second, and third angled struts 12, 14, and 16) will grow upward from the surface of the mask 330 or the surface of the transparent substrate 350, terminating at the free (e.g., upper) surface of the photo-monomer 320 in the channel 310 to form struts of the micro-truss structure.

Figure 4B:
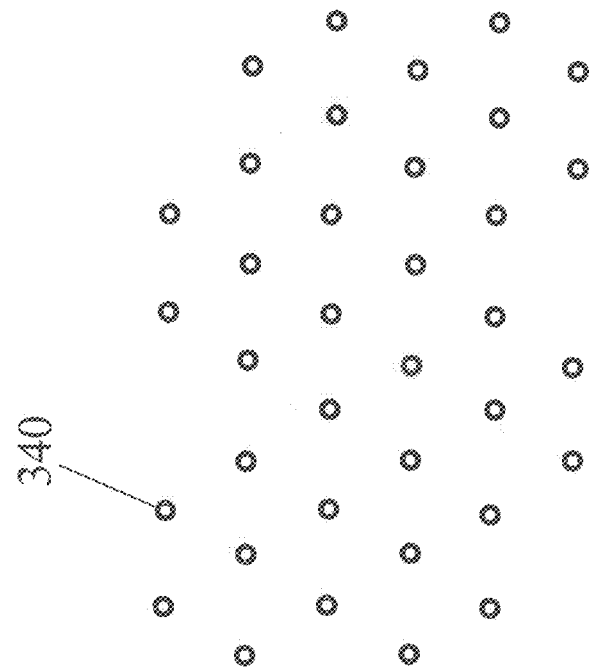
FIG. 4b illustrates a hexagonal mask pattern (or a hexagonal mask aperture pattern) according to an embodiment of the present invention.
Figure 4A:
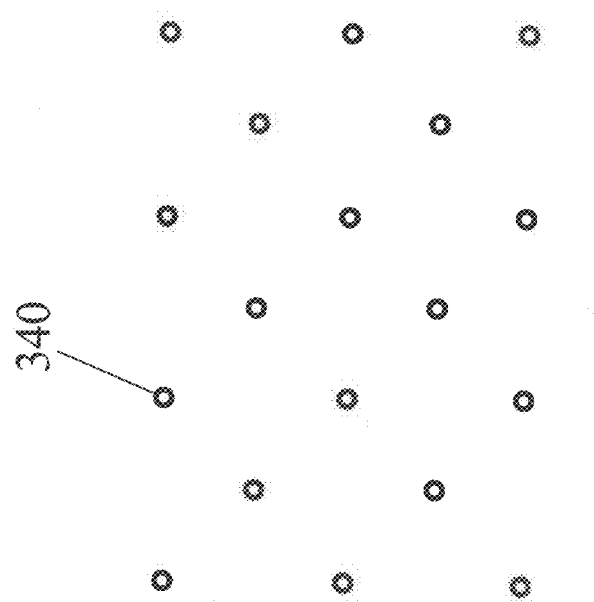
FIG. 4a illustrates a square mask pattern (or a square mask aperture pattern) according to an embodiment of the present invention.
Figure 5A:
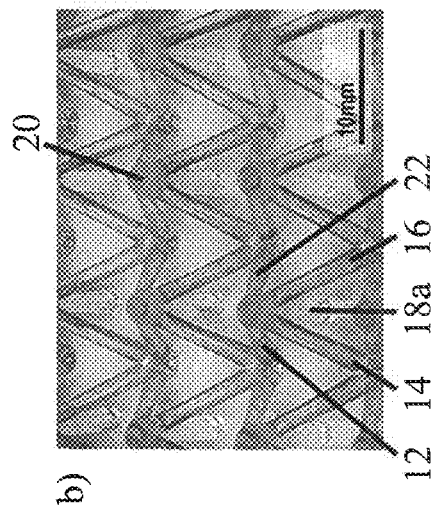
FIG. 5a is a perspective view of four angled struts and one vertical strut intersecting at a node according to one embodiment of the present invention.
Figure 5B:
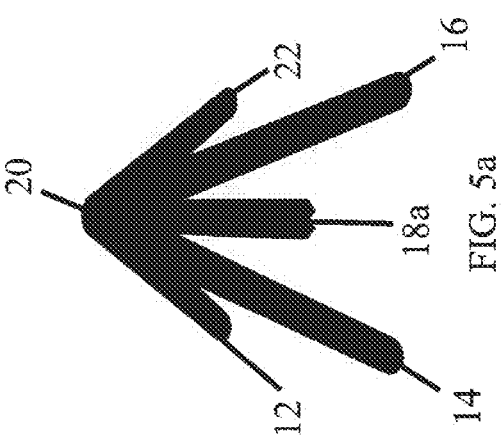
FIG. 5b is a photograph of a micro-truss structure according to one embodiment of the present invention.
Figure 5C:
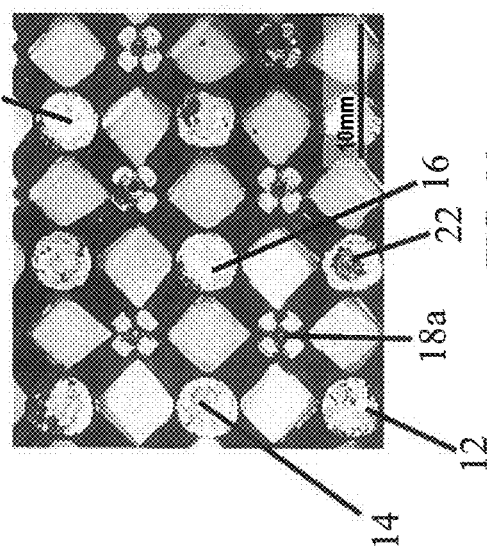
FIG. 5c is a perspective view of four angled struts and one vertical strut intersecting at a node according to one embodiment of the present invention.
Figure 5D:
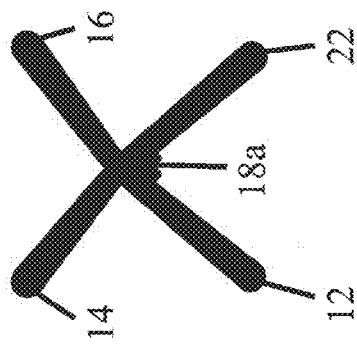
FIG. 5d is a photograph of a micro-truss structure taken in plan view according to one embodiment of the present invention.

Here, in FIG. 3a, a 3D network (or micro-truss structure 360) can be formed because the intersecting polymer waveguides 360a (or struts) will polymerize together, but will not interfere with waveguide propagation. Also, the spacing between the plurality of waveguides 360a (or struts) corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 (or struts) formed from each of the apertures 340 will determine the open volume fraction (i.e. open space) of the formed ordered 3D micro-truss structure (or the formed open-cell polymer micro-truss structure).

As such, using the system of FIG. 3a, an ordered 3D micro-truss structure 360 can be designed for various applications. The design parameters include: 1) the angle and pattern of the polymer waveguides (or struts) with respect to one another, 2) the packing, or relative density of the resulting cell structure (or the open volume fraction), and 3) the cross-sectional shape and dimensions of the polymer waveguides (or struts). Here, in one embodiment, the waveguide (or micro-truss) diameter of the angled and vertical struts (or waveguides) can range from 10 microns to 5 mm or larger (e.g., 10 mm) depending on the design criteria.

In one embodiment, the length of the waveguide (or strut) between nodes of interpenetrating waveguides (or struts) can be between 5 and 15 times the diameter. In addition, the number of nodes, or the number of repeating unit cells, through the thickness of the 3D micro-truss structure can be designed. A micro-truss structure may have ½ unit cell to 10 unit cells through its thickness (e.g., thickness in the 10 s of microns to 30 mm or larger). Moreover, the propagation distances and the size of the nodes of the interpenetrating waveguides (or struts) are unperturbed by the change in the index of refraction caused by polymerization, due to the method of formation of the ordered 3D micro-truss structure (or the open-cell polymer micro-truss structure).

In one embodiment, first, second, and third directions in which first, second, and third waveguides (or struts) respectively extend include first, second, and third angles, the first, second, and third angles having first, second, and third inclinations $\theta$ (e.g., with respect to the xz-plane as shown in FIG. 1) and first, second, and third azimuths (e.g., about the y-axis as shown in FIG. 1). In one embodiment, the first, second, and third inclinations each have the same or different values and each is in a range from 45° to 70° off the plane of the mask, inclusive. Similarly, in one embodiment the vertical struts may have an inclination from 80° to 90° off the plane of the mask, inclusive.

The inclination $\theta$ at which the first, second, and third waveguides (or struts) extend may be determined by an angle $\alpha$ (see, e.g., FIG. 3a) at which the collimated light sources 300 are oriented with respect to the mask 330 such that the collimated light passes through the apertures 340 of the mask 330 at an angle $\alpha$. Due to the refractive index change between air and the mask and monomer, in many instances the angles $\theta$ and $\alpha$ will not be the same.

Figure 3B:
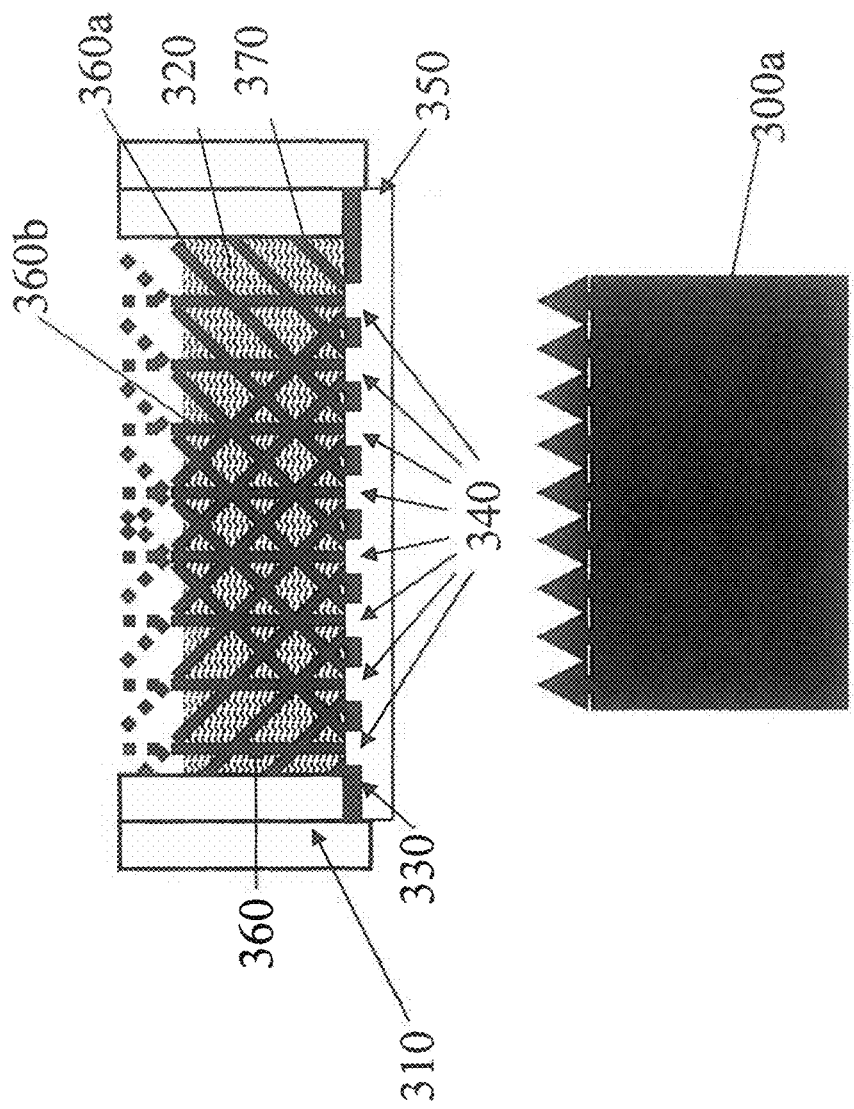
FIGS. 3c and 3d are schematic cross-sectional diagrams of a system for forming a structure from multiple waveguides created using a single collimated beam or multiple collimated beams passing through multiple apertures located at the top of the channel in both angled and vertical directions according to one embodiment of the present invention.
Figure 3C:
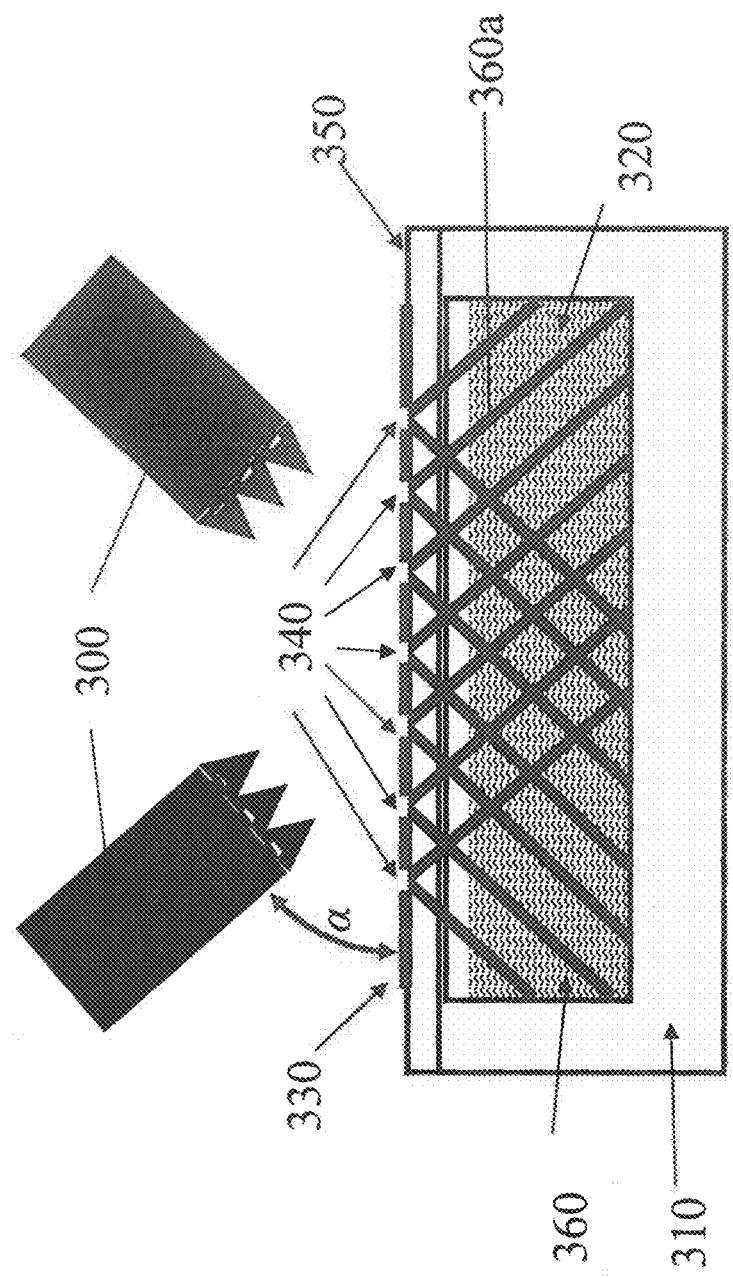
Figure 3D:
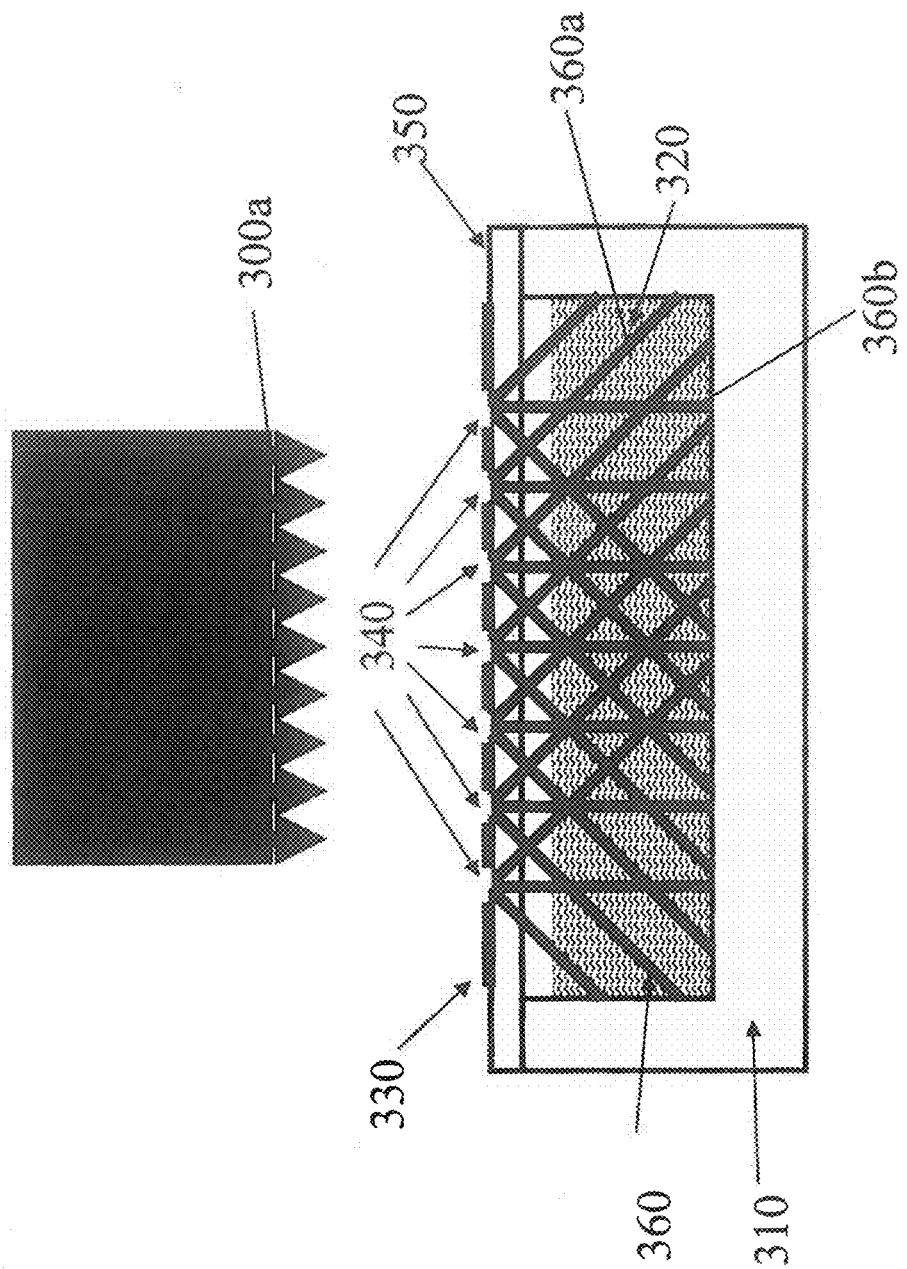

According to one embodiment of the present invention, the waveguides (or struts) further include vertical struts (or vertical polymer waveguides) 360b extending in a fourth direction with an inclination of substantially 90° (e.g., substantially perpendicular to the xz-plane). In some embodiments, the vertical struts 360b extend in a fourth direction at an inclination in the range from 80 to 90 with respect to the xz-plane (e.g., with respect to the plane of the mask). As illustrated in FIG. 3b, collimated light source 300a is oriented to emit light in a direction substantially perpendicular with respect to the mask 330.

In one embodiment, the vertical waveguides 360b (or struts) are formed after the angled waveguides 360a (or struts) are formed. The vertical waveguides 360b may be formed by using different collimated light sources 300a or may be formed using the same collimated light sources 300 that are used to form the angled waveguides by repositioning the collimated light sources 300 to emit light in a direction substantially perpendicular to the mask 330.

In another embodiment, the vertical waveguides 360b are formed concurrently with the angled waveguides 360b in which angled collimated light sources 300 and vertically oriented collimated light sources 300a concurrently emit light through apertures 340 in the mask 330.

Figure 2E:
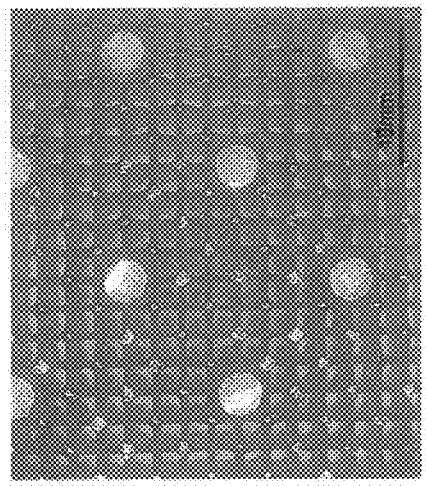
FIG. 2e is a photograph of a micro-truss structure taken in plan view, wherein the micro-truss structure includes a plurality of angled struts, thin vertical struts, and thick vertical struts according to one embodiment of the present invention.
Figure 2B:
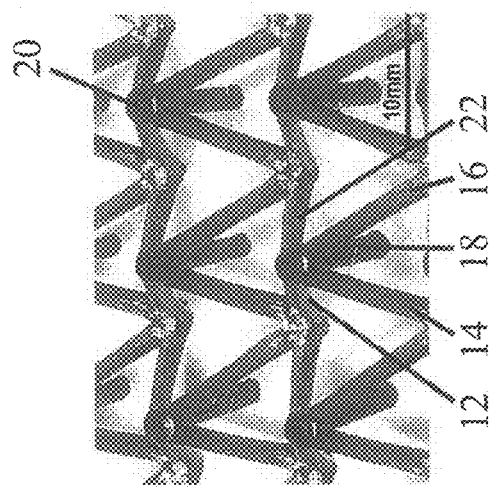
FIG. 2b is a photograph of a micro-truss structure according to one embodiment of the present invention.
Figure 2D:
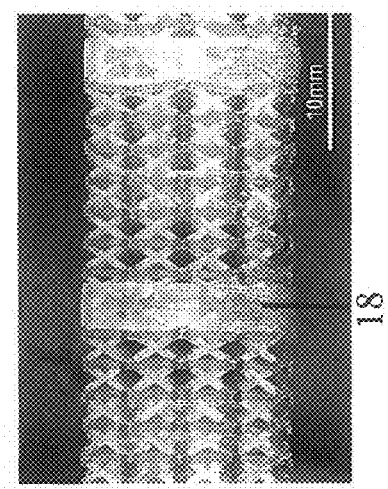
FIG. 2d is a photograph of a micro-truss structure taken in cross-sectional view, wherein the micro-truss structure includes a plurality of angled struts, thin vertical struts, and thick vertical strut according to one embodiment of the present invention.
Figure 2A:
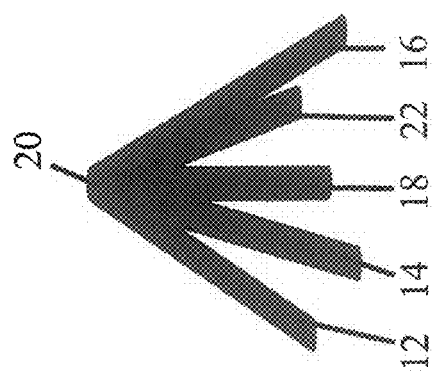
FIG. 2a is a perspective view of four angled struts and one vertical strut intersecting at a node according to one embodiment of the present invention.
Figure 2C:
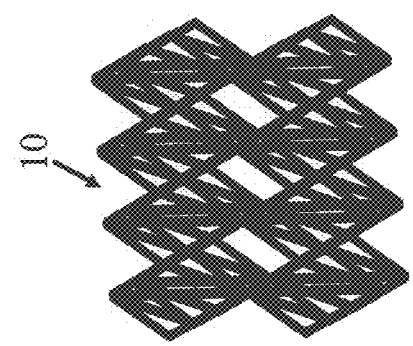
FIG. 2c is a perspective view of a micro-truss structure including a plurality of angled and vertical struts according to one embodiment of the present invention.

Although the vertical waveguides 360b (or vertical struts 18) are described above and are illustrated in FIG. 1 as having a diameter (or cross sectional area) substantially equal to that of the angled waveguides 360a (or angled struts 12, 14, and 16), according to other embodiments of the present invention, the vertical waveguides 360b (or vertical struts 18) may have a different diameter (or cross sectional area) than that of the angled waveguides (or angled struts 12, 14, and 16). In some embodiments the micro-truss structure includes vertical waveguides (or struts) that are equal in diameter (or cross sectional area) to the angled waveguides (or struts) as well as vertical waveguides (or struts) that have diameters (or cross sectional areas) different from those of the angled waveguides (or struts). For example, the vertical struts may have a diameter in the range from 10 µm to 5 mm or greater. In other embodiments, the diameters (or cross sectional areas) of the vertical waveguides (or struts) of the micro-truss structure may all be different from the diameters (or cross sectional areas) of the angled struts. FIG. 2d is a photograph of a side view of a micro-truss structure having both angled struts 12, 14, and 16 and vertical struts 18, the vertical struts 18 having a larger diameter (or cross sectional area) than the angled struts 12, 14, and 16.

In embodiments in which the vertical waveguides 360*b* (or vertical struts 18) have a diameter (or cross sectional area) different from the diameters (or cross sectional areas) of the of the angled waveguides 360*a* (or angled struts 12, 14, and 16), the vertical waveguides 360*b* may be formed using a mask having apertures that are larger or smaller than the apertures 340 of the mask 330 used to form the angled waveguides 360*a*. In another embodiment, the apertures of the mask used to form the vertical waveguides may have apertures that are spaced closer or farther apart than the apertures 340 of the mask 330 used to form the angled waveguides 360*a*. For example, the vertical waveguides may be formed through every node formed by the angled struts, or every second or third node formed by the angled struts. In still other embodiments, the vertical struts are arranged in a pattern that does not coincide with (e.g., is independent of) the pattern of the angled struts.

In another embodiment, a single mask having a plurality of apertures which may have different sizes may be used, and collimated light aimed perpendicular to the plane of the mask or at an angle is selectively emitted through the apertures of the mask.

Referring, for example, to FIG. 3*b*, in some embodiments, at least one digital mask may be used in place of the mask 330 below, above, or to either side of the channel 370, or in any combination of these locations between the collimated light sources and the photo-monomer 320. A digital mask is a display device which can be controlled to become opaque at some locations and transparent at other locations to the wavelength of light used to polymerize the photo-monomer, such as a liquid crystal display (LCD). One such liquid crystal display mask is disclosed in A. Bertsch, P. Bernhard, and P. Renaud, (2001) "Microstereolithography: Concepts and applications," paper presented at the 8th International IEEE Conference on Emerging Technologies and Factory Automation, Vol. 2, pp. 289-99, the entire disclosure of which is incorporated herein by reference. In embodiments where the collimated light sources 300 are located below the channel, the digital mask is located between the collimated light sources 300 and the transparent substrate 350. Additionally, the digital mask can be configured on-the-fly to display any variation of aperture sizes and patterns to produce the desired micro-truss structure 360, eliminating the need for stopping fabrication to change masks. For example, the digital mask may be used to from differently sized apertures for the angled struts and the vertical struts.

As such, in the above described embodiments of the present invention, the diameters (or cross sectional areas) and spacing of the vertical waveguides 360*b* (or the vertical struts 18) can be varied independently of the diameters (or cross sectional areas) and spacing of the angled waveguides 360*a* (or angled struts 12, 14, and 16). Therefore, the resistance of the micro-truss structure 10 to compression and shear forces can be adjusted independently based on the diameters and spacing of the vertical and angled waveguides 360*b* and 360*a* (or vertical and angled struts).

If all of the struts are at an equal angle θ with respect to the mask, then the compression modulus (E) can be approximated by:

$$E \approx E_s (\sin^4 \theta)(\rho/\rho_s)$$

where ρ is the density of the micro-truss structure 10, $\rho_s$ is the density of a solid material portion of the micro-truss structure 10, and $E_s$ is a modulus of the solid material portion of the micro-truss structure 10.

If all of the struts are at equal angle θ with respect to the mask, then the shear modulus (G) can be approximated by:

$$G \approx (E_s/8)(\rho/\rho_s)(\sin^2 2\theta)$$

The compression modulus (E) of a micro-truss structure which includes both angled and vertical struts can be approximated by:

$$E \approx E_s (\rho/\rho_s)[(\sin^4 \theta)(f_{angled}) + (f_{vertical})]$$

where $f_{vertical}$ is the fraction of the solid in the vertical orientation and $f_{angled}$ is the fraction of solid in the angled orientation at angle θ and where $f_{vertical} = 1 - f_{angled}$.

According to the shear modulus equation, vertical members will significantly contribute to the shear modulus, so the shear modulus for a micro-truss structure which includes both angled and vertical struts can be approximated by:

$$G \approx (E_s/8)(\rho/\rho_s)(f_{angled})(\sin^2 2\theta)$$

The equation above predicts that the shear modulus (G) is maximized when the angled struts extend at an angle θ=45°. Therefore, according to one embodiment of the present invention, the angled struts may extend at an angle of about 45°. However, in other embodiments of the present invention, the angled struts may extend at different angles (e.g., between 45° and 90°) so that the angled struts may provide additional compression resistance in conjunction with the vertical struts or in order to reduce the distance in which the collimated light forming the angled struts must propagate.

Therefore, the resistance of a micro-truss structure 10 to shear and compression forces can be designed by varying the diameters (or cross sectional areas) and volume fraction of the vertical and angled struts and varying the angle of the angled struts in accordance with the requirements of the applications to which the micro-truss structure will be applied. For example, the strut diameter (or cross sectional area) may be in the range of about 101 μm to about 10 mm and the volume fraction ratio of vertical struts to angled struts could be between about 2% and about 70%.

According to one embodiment of the present invention, as illustrated in FIGS. 1 and 2, the angled struts 12, 14, and 16 and the vertical struts 18 intersect at the nodes 20 to form symmetrical angles in three-dimensions (three orthogonal directions). The symmetrical angles relative to the xz-plane (see, FIG. 1), can measure between 0° and 90°. That is, the angled struts 12, 14, and 16 and the vertical struts 18 interpenetrate each other to form "perfect" nodes: each of the struts 12, 14, 16 defines an angle relative to a compression surface of the micro-truss 10 (e.g. a surface extending along a direction of the xz-plane) as well as with respect to the vertical struts 18, and the respective angles defined by the angled struts 12, 14, 16 are substantially equal to one another. However, embodiments of the present invention are not limited thereto.

According to one embodiment of the present invention, the polymer waveguides (or struts) are coated with a ductile or malleable material to improve the energy absorbing properties and to reduce the brittleness of the micro-truss structure. Also in a further embodiment of the present invention, base elements of a cellular structure are coated with a material different from the material of the cellular structural itself, and the base elements are removed to create a self-supporting structure having continuous but separated volumes.

In one embodiment of the present invention, the polymer micro-truss structure may be coated with a metal such as nickel, aluminum, titanium, steel, and alloys thereof to form a metal micro-truss structure of metal struts. Electro-deposition, slurry deposition, physical vapor deposition (PVD), or chemical vapor deposition (CVD) may be used to coat the polymer micro-truss structure. The polymer micro-truss structure can then be removed by burning or etching using a strong base, leaving a hollow, metal micro-truss structure. According to one embodiment of the present invention, each of the hollow metal struts may have an inner diameter in the range of 10 microns to 10 mm and the thickness of the metal (or the wall thickness) is in the range of 1 micron to 1 mm. The resulting metal micro-truss structure may have a relative density in the range 0.5% to 30% with respect to a solid metal block.

In one embodiment the polymer struts of the micro-truss can be converted to vitreous carbon struts by vacuum heat treatment(s) and can be subsequently coated with SiC, niobium or diamond using a high temperature coating process such as CVD.

Also, in one embodiment, a brittle micro-truss material, such as vitreous carbon, can be configured to absorb energy after initial fracture, by coating the vitreous carbon with one or more ductile materials to prevent (or protect from) catastrophic failure, and to enable additional absorption of energy through plastic deformation.

In some embodiments of the present invention, the ductile materials include polymer materials with a high failure strain (e.g., >10% strain at failure) such as aramids, polycarbonates, high impact polystyrene, nylons, ultra-high molecular weight polyethylene, and similar materials. Such materials may be formed on the polymer micro-truss using dip coating, spray coating, or CVD.

In still other embodiments of the present invention, the polymer waveguides may be coated with a ceramic material.

Additional improvements in compression strength may be realized through architectural optimization. Architectural optimization refers to trading off unit cell design, truss element (or strut) diameter, length, angles, number of truss elements (or struts) per unit cell and materials to achieve a desired set of properties (e.g., densification from an impact or pressure wave).

Referring to FIGS. 5a, 5b, 5c, and 5d, in some embodiments of the present invention the vertical struts 18a have a non-cylindrical shape (or non-circular cross section). The particular shape of the vertical struts 18a depends on the number of angled struts which interpenetrate at the nodes 20 through which the vertical struts interpenetrate the angled struts 12, 14, 16, and 22.

In the embodiments illustrated in FIGS. 5a, 5b, 5c, and 5d, four angled struts 12, 14, 16, and 22 interpenetrate at nodes 20. If the vertical member (or strut) 18a is formed in a subsequent exposure step (after the four angled struts have been formed), the vertical struts 18a have a "cross" or "plus" shape (see, e.g., FIG. 6a). This particular shape is the result of a lensing phenomenon during the process of making the microtruss structure. This geometry increases the moment of inertia of the vertical strut (relative to a vertical strut having a circular cross section) by approximately 20%, thereby increasing resistance to buckling deformation under a compressive load.

Figure 6C:
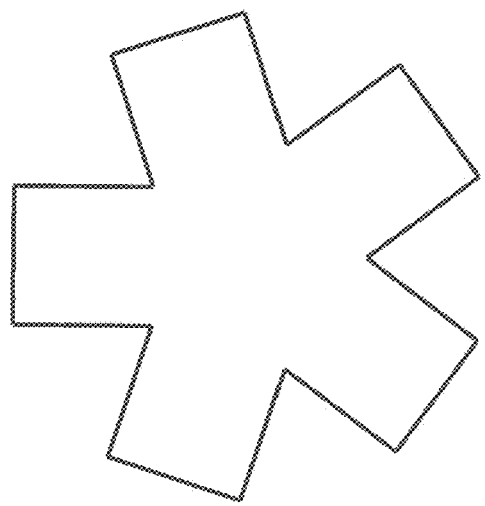
FIGS. 6a, 6b, and 6c are illustrations of cross-sectional shapes of vertical struts according to some embodiments of the present invention.
Figure 6B:
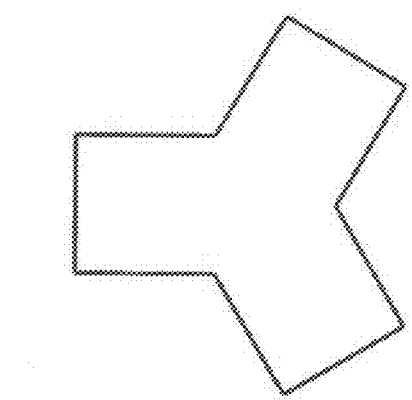
Figure 6A:
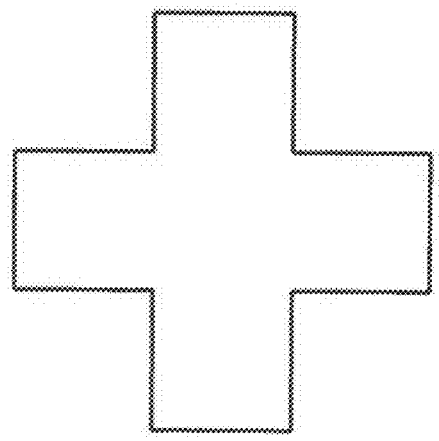

FIGS. 6a, 6b, and 6c illustrate cross-sectional shapes of the vertical struts according to other embodiments of the present invention. In embodiments which include n angled struts interpenetrating at nodes 20, the vertical struts interpenetrating the angled struts at those nodes 20 would have n petals (where n is a natural number) to form what may be referred to as an "n-petal" structure. For example, as illustrated in FIG. 6b, in an embodiment of the present invention which includes three angled struts, the vertical strut would have three petals (e.g., a three-pointed star with truncated tips). FIG. 6c illustrates the cross-sectional shape of the vertical strut in an embodiment in which five angled struts interpenetrate at the nodes. This effect diminishes as the vertical struts increase in diameter with respect to the diameter of the angled struts. For example, the shape of the vertical struts becomes more cylindrical and is substantially cylindrical when the vertical struts have a diameter about ten times the diameter of the angled strut. At smaller sizes, the cross-sectional shape of the vertical strut may be a combination of a shape similar to those illustrated in FIGS. 6a, 6b, and 6c and a circular shape. For example, as the vertical struts increase in diameter compared to the diameter of the angled struts, the radial size of the petals may decrease.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional micro-truss structure comprising:
a plurality of first polymer waveguide struts extending along a first direction;
a plurality of second polymer waveguide struts extending along a second direction;
a plurality of third polymer waveguide struts extending along a third direction; and
a plurality of fourth polymer waveguide struts extending along a fourth direction,
wherein the first, second, third, and fourth polymer waveguide struts interpenetrate one another at a plurality of nodes, the plurality of nodes defining a plane,
wherein each of the first, second, and third directions extends at a non-perpendicular angle with respect to the plane, the plane being substantially perpendicular to the fourth direction,
wherein the first, second, and third polymer waveguide struts that extend from the same node on the same side of the plane define a three-dimensional volume, and
wherein the fourth polymer waveguide strut that extends from the same node on the same side of the plane extends into the three-dimensional volume.

2. The three-dimensional micro-truss structure of claim 1, wherein each of the first, second, and third polymer waveguide struts have substantially the same cross sectional area.

3. The three-dimensional micro-truss structure of claim 2, wherein each of the plurality of fourth polymer waveguide struts has a cross sectional area substantially the same as cross sectional area of the first, second, and third polymer waveguide struts.

4. The three-dimensional micro-truss structure of claim 2, wherein each of the fourth polymer waveguide struts has a cross sectional area that is different from the cross sectional area of the first, second, and third polymer waveguide struts.

5. The three-dimensional micro-truss structure of claim 1, wherein each of the plurality of fourth polymer waveguide struts intersects a corresponding node of the plurality of nodes.

6. The three-dimensional micro-truss structure of claim 1, wherein the non-perpendicular angle is at 45°.

7. The three-dimensional micro-truss structure of claim 1, wherein at least one of the plurality of fourth polymer waveguide struts has a circular cross sectional shape.

8. The three-dimensional micro-truss structure of claim 1, wherein at least one of the plurality of fourth polymer waveguide struts has an n-petal cross sectional shape.

9. The three-dimensional micro-truss structure of claim 8, wherein n is four and the at least one of the plurality of fourth polymer waveguide struts has a plus shaped cross section.

10. The three-dimensional micro-truss structure of claim 8, wherein n is three.

11. The three-dimensional micro-truss structure of claim 8, wherein n is five.

12. The three-dimensional micro-truss structure of claim 1, wherein the plurality of first polymer waveguide struts, the plurality of second polymer waveguide struts, the plurality of third polymer waveguide struts, and the plurality of fourth polymer waveguide struts are coated with metal.

13. The three-dimensional micro-truss structure of claim 1, wherein the polymer waveguide struts are converted into vitreous carbon struts.

14. The three-dimensional micro-truss structure of claim 13, wherein the vitreous carbon struts are coated with silicon carbide, niobium, diamond, aramid fibers, polycarbonate, polystyrene, nylon, ultra-high molecular weight polyethylene, or ceramic.

15. The three-dimensional micro-truss structure of claim 1, wherein a portion of one of the first polymer waveguide struts, a first portion of one of the second polymer waveguide struts, and a first portion of one of the third polymer waveguide struts interpenetrate one another at a node of the plurality of nodes, and a second portion of the one of the first polymer waveguide struts, a second portion of the one of the second polymer waveguide struts, and a second portion of the one of the third polymer waveguide struts define vertices of a polygon, the polygon being parallel to the plane, and
    wherein a first portion of one of the fourth polymer waveguide struts interpenetrates the node, and a second portion of the one of the fourth polymer waveguide struts is in a central portion of the polygon.

16. The three-dimensional micro-truss structure of claim 1, wherein the first, second, and third polymer waveguide struts have the same length.

17. The three-dimensional micro-truss structure of claim 1, wherein each of the first, second, and third directions has an identical non-perpendicular angle with respect to the plane.

18. A three-dimensional micro-truss structure comprising:
    a plurality of first struts defined by a plurality of first self-propagating polymer waveguides and extending along a first direction;
    a plurality of second struts defined by a plurality of second self-propagating polymer waveguides and extending along a second direction;
    a plurality of third struts defined by a plurality of third self-propagating polymer waveguides and extending along a third direction; and
    a plurality of fourth struts defined by a plurality of fourth self-propagating polymer waveguides and extending along a fourth direction,
    wherein the first, second, third, and fourth struts interpenetrate one another at a plurality of nodes, the plurality of nodes defining a plane,
    wherein each of the first, second, and third directions extends at a non-perpendicular angle with respect to the plane, the plane being substantially perpendicular to the fourth direction,
    wherein the first, second, and third struts that extend from the same node on the same side of the plane define a three-dimensional volume, and
    wherein the fourth strut that extends from the same node on the same side of the plane extends into the three-dimensional volume.

19. The three-dimensional micro-truss structure of claim 18, wherein the plurality of first struts, the plurality of second struts, the plurality of third struts, and the plurality of fourth struts comprise metal, vitreous carbon, silicon carbide, niobium, diamond, aramid fibers, polycarbonate, polystyrene, nylon, or ultra-high molecular weight polyethylene.

20. A three-dimensional micro-truss structure comprising:
    a plurality of first polymer waveguide struts extending along a first direction;
    a plurality of second polymer waveguide struts extending along a second direction;
    a plurality of third polymer waveguide struts extending along a third direction;
    a plurality of fourth polymer waveguide struts extending along a fourth direction; and
    a plurality of fifth polymer waveguide struts extending along a fifth direction,
    wherein the first, second, third, fourth, and fifth polymer waveguide struts interpenetrate one another at a plurality of nodes, the plurality of nodes defining a plane,
    wherein each of the first, second, third, and fourth directions extends at a non-perpendicular angle with respect to the plane, the plane being substantially perpendicular to the fifth direction,
    wherein the first, second, third, and fourth polymer waveguide struts that extend from the same node on the same side of the plane define a three-dimensional volume, and
    wherein the fifth polymer waveguide strut that extends from the same node on the same side of the plane extends into the three-dimensional volume.

* * * * *